United States Patent
Lim et al.

(10) Patent No.: US 9,504,041 B2
(45) Date of Patent: Nov. 22, 2016

(54) HYBRID AUTOMATIC REPEAT REQUEST (HARQ) METHOD AND DEVICE IN A COOPERATIVE TERMINAL COMMUNICATION SYSTEM

(71) Applicant: LG ELECTRONICS INC., Seoul (KR)

(72) Inventors: Dongguk Lim, Anyang-si (KR); Hangyu Cho, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/006,789

(22) Filed: Jan. 26, 2016

(65) Prior Publication Data

US 2016/0143036 A1    May 19, 2016

Related U.S. Application Data

(63) Continuation of application No. 13/985,562, filed as application No. PCT/KR2011/010002 on Dec. 22, 2011, now Pat. No. 9,277,551.

(60) Provisional application No. 61/443,209, filed on Feb. 15, 2011.

(51) Int. Cl.
| | |
|---|---|
| *H04L 1/18* | (2006.01) |
| *H04W 72/04* | (2009.01) |
| *H04L 5/14* | (2006.01) |
| *H04L 27/26* | (2006.01) |
| *H04L 1/00* | (2006.01) |
| *H04W 48/16* | (2009.01) |

(Continued)

(52) U.S. Cl.
CPC ........ *H04W 72/0453* (2013.01); *H04L 1/0077* (2013.01); *H04L 1/1854* (2013.01); *H04L 1/1861* (2013.01); *H04L 1/1887* (2013.01); *H04L 1/1896* (2013.01); *H04L 5/1469* (2013.01); *H04W 72/0433* (2013.01); *H04L 1/1812* (2013.01); *H04L 5/0035* (2013.01); *H04L 5/0053* (2013.01); *H04L 5/0055* (2013.01); *H04L 5/0094* (2013.01); *H04L 27/2602* (2013.01); *H04L 2001/0092* (2013.01); *H04W 28/18* (2013.01); *H04W 48/16* (2013.01); *H04W 72/042* (2013.01)

(58) Field of Classification Search
CPC .. H04L 1/0077; H04L 1/1861; H04W 72/04; H04W 72/0433; H04W 72/0453
See application file for complete search history.

(56) References Cited

U.S. PATENT DOCUMENTS

| | | | |
|---|---|---|---|
| 8,098,623 B2 * | 1/2012 | Ramesh ................ | H04L 1/0083 370/329 |
| 8,422,429 B2 | 4/2013 | Nam et al. | |

(Continued)

FOREIGN PATENT DOCUMENTS

| | | |
|---|---|---|
| WO | 2010/036008 | 4/2010 |
| WO | 2010/062097 | 6/2010 |

*Primary Examiner* — Brian O'Connor
(74) *Attorney, Agent, or Firm* — Lee Hong Degerman Kang & Waimey

(57) ABSTRACT

A method for performing a device to device (D2D) communication is performed by a first wireless device and includes receiving, by the first wireless device through a primary carrier, an allocation of a secondary carrier from a base station. Here, the primary carrier is used for data transmission and reception with the base station and the secondary carrier allocated by the base station is used for data transmission and reception with a second wireless device. The method further includes transmitting data to the second wireless device on a subframe of the secondary carrier.

13 Claims, 10 Drawing Sheets

(51) Int. Cl.
*H04L 5/00* (2006.01)
*H04W 28/18* (2009.01)

(56) References Cited

U.S. PATENT DOCUMENTS

| | | | | |
|---|---|---|---|---|
| 8,514,820 B2* | 8/2013 | Cai | ................ | H04L 1/0028 370/328 |
| 8,737,286 B2* | 5/2014 | Golitschek | ......... | H04B 7/15542 370/315 |
| 8,743,771 B2* | 6/2014 | Park | ................ | H04B 7/155 370/315 |
| 8,792,431 B2* | 7/2014 | Kondo | ................ | H04W 16/14 370/328 |
| 8,953,505 B2* | 2/2015 | Chun | ................ | H04L 1/1887 370/280 |
| 8,953,615 B2 | 2/2015 | Cai et al. | | |
| 9,014,067 B2* | 4/2015 | Chun | ................ | H04B 7/15542 370/281 |
| 9,042,410 B2* | 5/2015 | Lim | ................ | H04L 5/1469 370/330 |
| 9,131,490 B2* | 9/2015 | Feng | ................ | H04L 5/0007 |
| 9,277,551 B2* | 3/2016 | Lim | ................ | H04L 1/1854 |
| 9,300,452 B2* | 3/2016 | Yang | ................ | H04L 5/0091 |
| 2008/0075032 A1* | 3/2008 | Balachandran | ....... | H04W 72/04 370/317 |
| 2009/0175214 A1 | 7/2009 | Sfar et al. | | |
| 2010/0135238 A1* | 6/2010 | Sadri | ................ | H04W 72/0453 370/329 |
| 2010/0278123 A1* | 11/2010 | Fong | ................ | H04B 7/2656 370/329 |
| 2011/0141989 A1* | 6/2011 | Kondo | ................ | H04W 16/14 370/329 |
| 2011/0274043 A1 | 11/2011 | Nam et al. | | |
| 2012/0201164 A1 | 8/2012 | Jongren et al. | | |
| 2014/0056266 A1 | 2/2014 | Montojo et al. | | |

* cited by examiner

—— First network (e.g., WiMAX)
------ Second network (e.g., WiFi)

HYBRID AUTOMATIC REPEAT REQUEST (HARQ) METHOD AND DEVICE IN A COOPERATIVE TERMINAL COMMUNICATION SYSTEM

CROSS-REFERENCE TO RELATED APPLICATIONS

This application is a continuation of U.S. patent application Ser. No. 13/985,562, filed on Aug. 14, 2013, now U.S. Pat. No. 9,277,551, which is the National Stage filing under 35 U.S.C. 371 of International Application No. PCT/KR2011/010002, filed on Dec. 22, 2011, which claims the benefit of U.S. Provisional Application No. 61/443,209, filed on Feb. 15, 2011, the contents of which are all hereby incorporated by reference herein in their entirety.

BACKGROUND OF THE INVENTION

1. Field of the Invention

The present invention relates to a hybrid automatic repeat request (HARQ) method in a wireless access system that supports collaborative transmission and a device using the same.

2. Related Art

M2M Communication (Machine Type Communication: MTC)

A machine-to-machine (M2M) communication (machine type communication, MTC) is described in brief below.

Machine to machine (M2M) communication as it is means communication between electronic devices. That is, M2M communication means communication between things. In general, M2M communication means wired or wireless communication between electronic devices or communication between a device and a machine which are controlled by human beings, but M2M communication is used to specially denote wireless communication between an electronic device and an electronic device, that is, devices. Furthermore, M2M devices used in a cellular network may have lower performance or capability than common terminals.

There are many terminals within a cell, and the terminals may be classified depending on the type, class, service type, etc of the terminal. For example, according to an operation type of terminals, the terminals can be divided into a terminal for human type communication (HTC) and machine type communication (MTC). The MTC may include communication between M2M devices. Herein, the HTC implies a signal transmission/reception operation in which signal transmission is determined by human interventions, and the MTC implies an operation in which each terminal autonomously transmits a signal either periodically or in an event-driven manner without human interventions.

In addition, when machine to machine (M2M) communication (or machine type communication (MTC)) is taken into consideration, the total number of terminals will increase suddenly. M2M devices may have the following features depending on supported service.

1. A large number of terminals within a cell
2. A small amount of data
3. Low transmission frequency (may have periodicity)
4. A limited number of data characteristics
5. Not sensitive to time delay
6. Low mobility or fixed In addition, the M2M communication can be used in various fields such as secure access and surveillance, tracing and recovery, public safety (emergency situation, disasters), payment (vending machines, ticketing machines, parking meters), healthcare, remote control, smart meters, etc.

Client Cooperation (Collaborative Transmission)

Standardization for a cooperative-MIMO (CO-MIMO) and a signal transmission through a relay or femto cell in an IEEE 802.16m system or LTE (-A) system is in progress to enhance transmission efficiency and throughput of devices with poor channel status among MSs positioned in a cell. Further, besides methods of supporting devices using a base station or a femto cell or relay that operates as a base station as described above, research for client cooperation (CC) that transmits signals through cooperation between devices is recently underway for the 802.16 systems or LTE (-A) systems.

Herein, CC means that a signal is transmitted and received through device-to-device direct communication unlike the aforementioned repeater or femto cell, and the transmitted and received signal is collaboratively transmitted to a device or a base station.

When a source device and a collaborative device collaboratively transmits a signal to the base station in a UL region through collaborative transmission, a signal may be generated, which is used for even the collaborative device that transmits UL data of the source device to the base station to transmit its own UL data to the base station. In this case, the collaborative device needs to receive a resource allocation for transmitting a UL signal from the base station by performing a resource request for transmitting the signal to the base station in order to transmit its own signal during collaborative transmission.

HARQ (Hybrid Automatic Repeat Request)

A technique that increases reliability of wireless communication includes an automatic repeat request (ARQ). In the ARQ, when a receiver fails to receive a data signal, a transmitter retransmits the data signal. Further, the technique also includes a hybrid automatic repeat request (HARQ) acquired by combining a forward error correction (FEC) and the ARQ. A receiver using the HARQ basically attempts error correction for the received data signal and determines retransmission or not by using an error detection code. The error detection code may use a cyclic redundancy check (CRC). When an error of the data signal is not detected through a CRC detection process, the receiver judges that decoding the data signal is succeeded. In this case, the receiver transmits acknowledgement (ACK) signal to the transmitter. When the error of the data signal is detected through the CRC detection process, the receiver judges that decoding the data signal is failed. In this case, the receiver transmits a non-acknowledgement (NACK) signal to the transmitter. When the transmitter receives the NACK signal, the transmitter may retransmit the data signal.

As such, the HARQ is an important technique that increases the reliability of the wireless communication. However, in order to perform the HARQ, when the data signal is transmitted or received or when the HARQ ACK/NACK signal for the data signal is transmitted or received be discussed. Therefore, in the wireless communication system, an efficient HARQ performing method needs to be provided.

SUMMARY OF THE INVENTION

The present invention provides a method of efficiently performing an HARQ in a wireless access system that supports collaborative transmission. In detail, the present invention provides a method for performing an HARQ in a wireless access system in which a separately allocated carrier is used for the collaborative transmission.

To achieve the object of the present invention describe above, in an aspect, a method for a device to perform a hybrid automatic repeat request (HARQ) in a wireless access system that supports collaborative transmission is provided. The method includes allocating a secondary carrier from a base station through a primary carrier. The primary carrier is used for data transmission and reception with the base station and the secondary carrier is used for data transmission and reception with the other device. The method includes receiving a preamble and configuration information of the secondary carrier from the base station, transmitting data to the other device in an uplink subframe of the secondary carrier based on the received configuration information, and receiving acknowledgement (ACK) or non-acknowledgement (NACK) for the transmitted data in a downlink subframe of the secondary carrier linked with the uplink subframe. The configuration information of the secondary carrier includes frame structure information used in the secondary carrier, the frame structure information includes the arrangement and linkage of the uplink subframe and the downlink subframe in a frame, and the uplink subframe and the downlink subframe are allocated to the frame at different times.

Receiving the preamble and the configuration information of the secondary carrier may comprise receiving the preamble and the configuration information of the secondary carrier through the secondary carrier.

Receiving the preamble and the configuration information of the secondary carrier may comprise receiving the preamble and the configuration information of the secondary carrier through a first subframe in a frame of the secondary carrier.

Receiving the preamble and the configuration information of the secondary carrier may comprise receiving the preamble and the configuration information of the secondary carrier through a first subframe and a second subframe in a frame of the secondary carrier.

The configuration information of the secondary carrier may be included in a superframe header or an A-MAP.

Receiving the preamble and the configuration information of the secondary carrier may comprise receiving the preamble and the configuration information of the secondary carrier through the primary carrier.

Receiving the preamble and the configuration information of the secondary carrier may comprise receiving the preamble through the secondary carrier, and receiving the carrier configuration information through the primary carrier.

Receiving the ACK or NACK may comprise receiving the ACK or NACK from the base station through the primary carrier.

Receiving the ACK or NACK may comprise receiving the ACK or NACK from a collaborative device through the secondary carrier.

The frame structure information may include information on a switching gap, and the switching gap may be positioned between the uplink subframe and the downlink subframe.

In another aspect, a method for a collaborative device to perform a hybrid automatic repeat request (HARQ) in a wireless access system that supports collaborative transmission is provided. The method includes allocating a secondary carrier from a base station through a primary carrier. The primary carrier is used for data transmission and reception with the base station and the secondary carrier is used for data transmission and reception with the other device. The method includes receiving a preamble and configuration information of the secondary carrier from the base station, receiving from the other device in an uplink subframe of the secondary carrier based on the received configuration information, and transmitting acknowledgement (ACK) or non-acknowledgement (NACK) for the transmitted data in a downlink subframe of the secondary carrier linked with the uplink subframe. The configuration information of the secondary carrier includes frame structure information used in the secondary carrier, the frame structure information includes the arrangement and linkage of the uplink subframe and the downlink subframe in a frame, and the uplink subframe and the downlink subframe are allocated to the frame at different times.

Transmitting the ACK or NACK may comprise transmitting the ACK or NACK to the base station through the primary carrier.

Transmitting the ACK or NACK may comprise transmitting the ACK or NACK to the collaborative device through the secondary carrier.

In another aspect, a device for performing a hybrid automatic repeat request (HARQ) in a wireless access system that supports collaborative transmission is provided. The device includes a radio frequency unit for transmitting and receiving wireless signals to and from the outside, and a controller coupled to the radio frequency unit. The processor is configured for controlling the radio frequency unit to be allocated with a secondary carrier from a base station through a primary carrier. The primary carrier is used for data transmission and reception with the base station, and the secondary carrier is used for data transmission and reception with the other device. The processor is configured for controlling the radio frequency unit to receive a preamble and configuration information of the secondary carrier from the base station, controlling the radio frequency unit to transmit data to the other device in an uplink subframe of the secondary carrier based on the received configuration information, and controlling the radio frequency unit to receive acknowledgement (ACK) or non-acknowledgement (NACK) for the transmitted data in a downlink subframe of the secondary carrier linked with the uplink subframe. The configuration information of the secondary carrier includes frame structure information used in the secondary carrier, the frame structure information includes the arrangement and linkage of the uplink subframe and the downlink subframe in a frame, and the uplink subframe and the downlink subframe are allocated to the frame at different times.

According to embodiments of the present invention, a device and a base station can efficiently perform HARQ process in a wireless access system that allocates a separate carrier for collaborative transmission. Further, the present invention can provide a frame structure suitable for the HARQ process.

DESCRIPTION OF EXEMPLARY EMBODIMENTS

Figure 1:
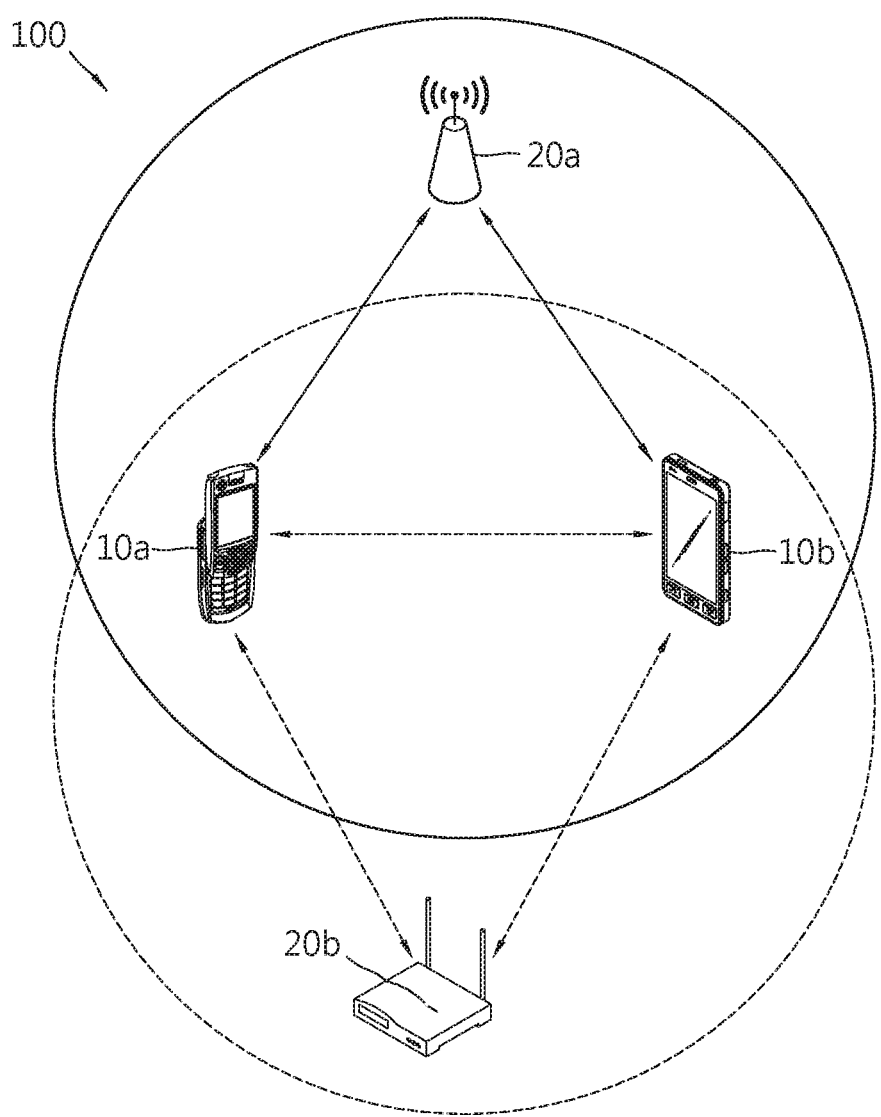
FIG. 1 is a concept diagram showing an example of a wireless communication system performing collaborative transmission according to an embodiment of present invention.

In addition, the terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms are intended to include the plural forms as well, unless the context clearly indicates otherwise. In the present application, it is to be understood that the terms such as "including" or "having", etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Further, a "module" and a "unit" suffixes for components used in the present invention are given or mixed and used by considering easiness in preparing a specification and do not have a meaning or role distinguished from each other in themselves.

It will be understood that although the terms "first" and "second" are used herein to describe various elements, these elements should not be limited by these terms. These terms are only used to distinguish one element from another element. For example, a first component may be termed a second component, and similarly, a second component may be termed a first component without departing from the scope of the present invention.

Hereinafter embodiments of the present invention will be described in detail with reference to the accompanying drawings, in which like or similar reference numerals refer to like elements regardless of reference numerals and a duplicated description thereof will be omitted.

Further, on describing the present invention, when it is determined that the detailed description of the known art related to the present invention may obscure the gist of the present invention, the detailed description thereof will be omitted. Further, it is noted that the accompanying drawings are used just for easily appreciating the spirit of the present invention and it should not be analyzed that the spirit of the present invention is limited by the accompanying drawings.

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. In addition, IEE 802.16p provides a communication standard for supporting a machine-to-machine communication (machine type communication: MTC).

Hereinafter, in order to clarify a description, embodiments of the present invention are described by IEEE 802.16 chiefly, but the technical spirit of the present invention is not limited thereto.

FIG. 1 is a concept diagram showing an example of a wireless communication system performing collaborative transmission according to an embodiment of present invention.

Referring to FIG. 1, the wireless communication system includes a terminal 10a, 10b (MS) and a base station 20a, 20b (BS). The terminal 10a, 10b may be stationary or mobile and may be referred to by other terms such as a mobile station (MS), a user equipment (UE), a user terminal (UT), a subscriber station (SS), a wireless device or an advanced mobile station (AMS). Further, the terminal 10a, 10b includes the concept of an M2M terminal.

Further, in case the wireless communication system shown in FIG. 1 supports collaborative communication (or transmission), the terminal 10a, 10b includes the concept of a collaborative transmission requesting device requesting collaborative transmission, a collaborative transmission accepting device accepting the collaborative transmission, and a collaborative transmission participating device participating in the collaborative transmission.

The base station 20a, 20b is generally a fixed station communicating with the terminal 10a, 10b and may be referred to by other terms such as a BS, nodeB, a base transceiver system (BTS), or an access point. One or more cells may be included in one base station.

Hereinafter, what is related to collaborative transmission is briefly described.

Collaborative transmission (CT) refers to transmitting and receiving signals or data through a direct (link) communication between terminals and cooperatively transmitting the transmitted/received signals or data to a base station or a terminal.

Here, terminals may be classified, depending on their operation and roles, into non-cooperative terminals, cooperation-capable terminals, cooperation participating terminals, cooperative transmission terminals, and cooperation requesting terminals. The non-cooperative terminals may also be referred to as single transmission terminals. The cooperation-capable terminals may also be referred to as cooperative terminal candidates.

Here, the cooperation participating terminals refer to terminals that participate in collaborative transmission but do not send data to a base station.

Hereinafter, as used herein, a terminal requesting collaborative transmission may be referred to as a first terminal 10a, and a terminal accepting collaborative transmission request, i.e., a terminal transmitting UL data of the first terminal to the base station, may be referred to as a second terminal 10b.

As described above, the first terminal may be also referred to a cooperation requesting terminal, a source MS (S-MS) or a cooperation subject terminal, and the second terminal may be also referred to a cooperation accepting terminal, a cooperating MS (C-MS), a target MS (T-MS), or a cooperated terminal.

In other words, the first terminal means a subject terminal in data transmission/reception with a base station and/or a relay station, and the second terminal means a terminal that assists in data transmission/reception between a source MS with a base station and/or a relay station.

Further, a direct transmission between two terminals performing collaborative transmission may use single radio access technology (RAT) or multi RATs. At this time, in case a terminal performing collaborative transmission supports the multi RAT, a RAT different from a RAT used for signal transmission with the base station may be used to perform signal transmission/reception between the two terminals.

When collaborative transmission is performed in a machine to machine (M2M) communication system, a base station can allocate a separate carrier to an MS in a cell. In this case, the separate carrier (hereinafter, a secondary carrier) is allocated among carriers other than a primary carrier used between the base station and the MS. This is to prevent interference between the carriers. The secondary carrier may be used only for communication between both MSs or even for communication between both MSs and between base station and the MS. A frame structure in the secondary carrier will be descried in FIGS. 2 and 3.

Figure 2:
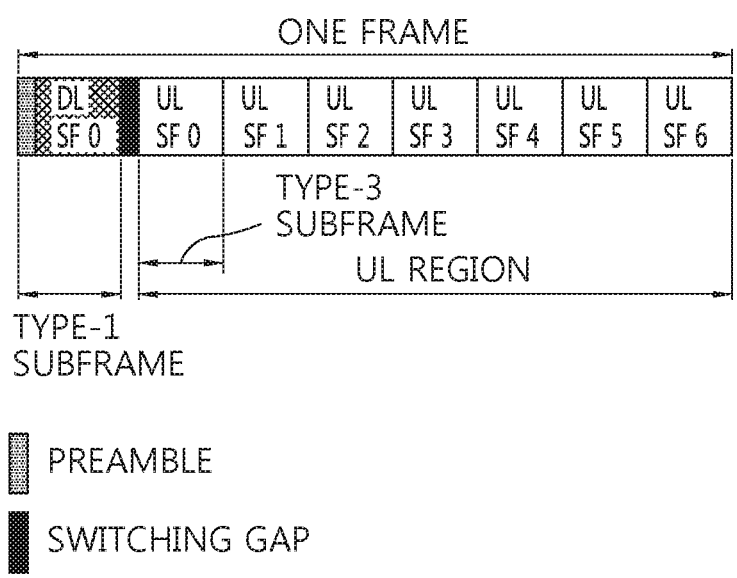
FIG. 2 is an embodiment of a frame structure used in collaborative transmission.

FIG. 2 is an embodiment of a frame structure used in collaborative transmission.

As described in FIG. 1, a secondary carrier is used for communication between MSs. In this case, a frame structure (FS) of the secondary carrier may use a separate structure and/or D/U ratio without succeeding an FS used for communication between a base station and an MS, that is, an FS of a primary carrier. Both MSs may maintain synchronization with the base station by using a preamble transmitted from the base station through the secondary carrier. Further, both MSs receive configuration information (for example, cell_ID, FS, BW, allocation, and fc) of the secondary carrier through a broadcast signal transmitted through a specific frame of the secondary carrier. The broadcast signal may be a superframe header and an A-MAP. In order to receive the preamble and the configuration information, one or more subframes among frames of the secondary carrier are allocated. In particular, a first subframe of each frame is allocated to receive the SFH with the preamble.

In FIG. 2, a frame structure in which one subframe (DL SF0) is allocated to receive the preamble and the configuration information of the secondary carrier is shown.

In this case, since the preamble and the configuration information of the secondary carrier are transmitted through a type-1 subframe, a second subframe (UL SF0) of the frame includes a switching gap and a transmit/receive transition gap (TTG). Therefore, the second subframe (UL SF0) of the frame is formed by a type-3 subframe constituted by five symbols by allocating one symbol to a gap. The type-3 subframe may be used to transmit and receive UL control information and data or used as an idle duration or a punctured subframe.

Data transmission and reception between both MSs is achieved by a UL subframe. Therefore, a source device (SD) and a collaborative device (CD) use the same frame structure. In this case, the source device uses a specific region of the UL frame as a transmission zone (Tx zone or a D2D collaborative uplink transmit zone (DCUTZ)) and the collaborative device uses the same region as a reception zone (Rx zone or a D2D collaborative uplink receive zone (DCURZ). The device may find distinguishing the transmission and reception zones (TX and Rx zones) through relevant control information received from the base station.

The device may receive only the preamble through a subframe of the secondary carrier and receive the configuration of the secondary carrier through the primary carrier as another embodiment of receiving the preamble and the configuration information of the secondary carrier.

Figure 3:
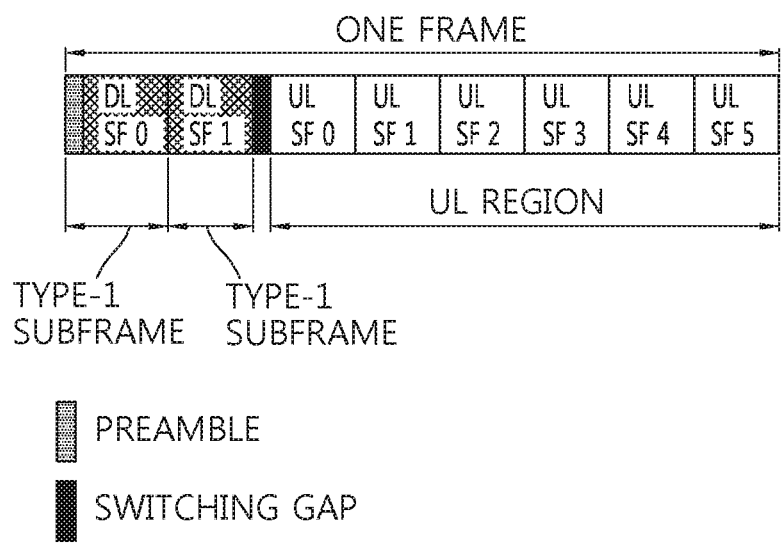
FIG. 3 is another embodiment of a frame structure used in collaborative transmission.

FIG. 3 is another embodiment of a frame structure used in collaborative transmission.

As shown in FIG. 2, when the device allocates one DL subframe in order to receive the preamble and the configuration information of the secondary carrier, since the subframe (type-3 subframe) constituted by five symbols is created in the UL region, forming a new UL control channel is required. In order to avoid such a case, as the DL subframe that receives the preamble and the configuration information of the secondary carrier, two subframes DL SF0 and DL SF1 may be allocated. In this case, a first subframe DL SF0 is used for the device to receive the preamble and the SFH. Since a second subframe DL SF1 includes a switching gap, the second subframe DL SF1 is constituted by the type-3 subframe. Herein, the symbol allocated to the gap is positioned at a last symbol of the second subframe DL SF1. In this case, the device may receive a midamble transmitted through the second subframe DL SF1 and transmit a result acquired by measuring a DL channel between the base station and the device to the base station. In this case, each device may transmit the measurement result to the base station through the primary carrier and the source device may transmit the result to the base station by using the collaborative transmission through the collaborative device.

Another Embodiment for Device to Receive Preamble and Configuration Information of Secondary Carrier Unlike FIGS. 2 and 3, each device may receive the configuration information of the secondary carrier for performing the collaborative transmission through the primary carrier. In this case, both devices may receive the preamble from the base station through the first subframe in the frame of the primary carrier. Both devices may receive a device time offset, etc, together with the configuration information (frame structure, bandwidth, time offset, etc.) of the secondary carrier. The configuration information of the secondary carrier may be transmitted in a multicast or unicast form through a D2D_Collaborative_transmission message. Further, the base station may transmit the configuration information of the secondary carrier to the device together with information on the primary carrier by using one signaling. In this case, information on the secondary carrier and information on the collaborative transmission may be masked by grouping/paring/virtual ID allocated to the devices or transmitted together with the ID.

In this case, since the secondary carrier is used only for the communication between devices, the device may use all frames of the secondary carrier as the UL frame. Since the source device operates in a transmission mode in order to transmit a signal to the collaborative device, the source device may use the UL frame as the D2D collaborative uplink transmit zone (DCUTZ). Since the collaborative device receives data from the source device through the UL frame, the collaborative device may use the UL frame as the D2D collaborative uplink receive zone (DCURZ). The base station transmits a zone defined for the collaborative transmission of the collaborative device and the source device to both devices through the first carrier. When the device supports a multi-carrier operation, the device may perform the collaborative transmission by using the primary carrier and the secondary carrier. In this case, each device may alternately use both carriers similarly or with a predetermined cycle (frame or superframe) for transmitting and receiving data. However, when the device does not support the multi-carrier operation, that is, when the device transmits and receives the signal through a single-carrier operation, the device receives information (resource allocation, power control, time/frequency offset, grouping/pairing/virtual ID, MCS, MIMO, etc.) required for the collaborative transmission and the configuration information (BW, fc, FS, etc.) of the secondary carrier through the primary carrier and switches the primary carrier to the secondary carrier. Thereafter, the device performs the collaborative transmission. The information is transmitted with a long cycle (superframe or 50 ms) in order to reduce a waste generated by frequent carrier switching.

Figure 4:
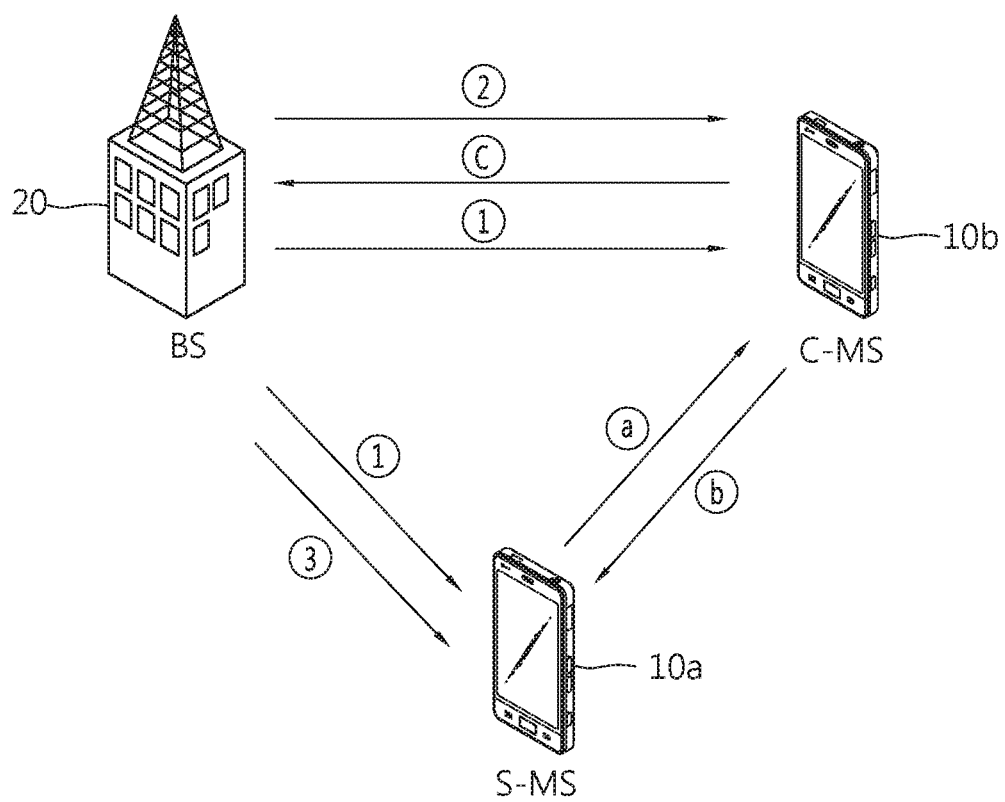
FIG. 4 is a conceptual diagram of HARQ performed in collaborative transmission according to embodiments of the present invention.

FIG. 4 is a conceptual diagram of HARQ performed in collaborative transmission according to embodiments of the present invention.

When the devices perform the collaborative transmission through the secondary carrier which is separately allocated, the HARQ may be performed between both devices, between the base station and the source device, or between the base station and the collaborative device.

In all of the three cases, a source device 10a and a collaborative device 10b that perform the collaborative transmission receive information for the collaborative transmission and the information on the secondary carrier from the base station. The information may be known by receiving the preamble, the SFH, the A-MAP, etc. Herein, the information may be transmitted through the DL subframe of the secondary carrier or through the DL subframe of the primary carrier as shown in FIGS. 2 and 3.

The method for performing the HARQ in the three cases will be described below in detail.

(1) HARQ Performed Between Source Device and Collaborative Device

Referring to FIG. 4, the source device 10a transmits data to the collaborative device 10b through a link a and the collaborative device 10b transmits the HARQ (ACK/NACK) for the received data to the source device 10a. In this case, the frame of the secondary carrier may be configured by dividing the rest of subframes other than the DL subframe that transmits and receives the signal to and from the base station into the DL and UL subframes or may be configured by dividing the subframe constituted by the UL subframe into the reception zone (Rx zone) and the transmission zone (Tx zone).

When the frame of the secondary carrier is configured by the DL subframe and the UL subframe, each subframe may be defined as the D2D collaborative downlink zone (DCDZ) and the D2D collaborative uplink zone (DCUZ).

When the frame of the secondary carrier is configured by the Rx zone and the Tx zone, each subframe may be defined as the D2D collaborative uplink transmission zone (DCUTZ) and the D2D collaborative uplink reception zone (DCURZ).

When an error occurs in data received by using such a frame structure, the collaborative device 10b does not transmit the data to the base station but transmits the NACK and/or retransmission request to the source device 10a through a link b. Thereafter, the collaborative device 10b that receives data without an error transmits the received data to the base station through a link c. The link c may be configured by using the primary carrier.

The base station that receives data through the link c transmits the HARQ for the received data to the collaborative device 10b through a link 2. Herein, the link 2 may be configured by using the primary carrier or configured by using the allocated DL subframe in the frame of the secondary carrier. The collaborative device 10b that receives the HARQ from the base station through the link 2 performs retransmission or new transmission depending on the ACK/NACK.

Since the HARQ through the above process is independently performed through individual links between the source device 10a and the collaborative device 10b, and between the collaborative device 10b and the base station 20, error transferring is reduced and accurate data transmission is enabled. However, a time until the base station 20 receives the data transmitted by the source device 10 may be lengthened.

(2) HARQ Performed Between the Source Device and the Base Station

The source device 10a transmits data to the collaborative device 10b through the link a and the collaborative device 10b transmits the data received from the source device 10a to the base station through a link c without error checking. In this case, the link a and the link c may be configured by using the secondary carrier and the primary carrier, respectively. In this case, the source device and collaborative device may perform the collaborative transmission by using the frame structure of FIG. 2 or 3. The base station that receives the data through the link c performs error checking for the received data and transmits a HARQ (ACK/NACK) feedback through a link 3. In this case, the link 3 may be configured by using the first or secondary carrier. When the link 3 is configured by using the secondary carrier, the HARQ (ACK/NACK) feedback is transmitted to the source device 10a through the DL subframe of FIG. 2 or 3. The source device 10a performs new transmission or retransmission to the collaborative device 10b in accordance with the HARQ feedback.

(3) HARQ Performed Between Collaborative Device and Base Station

The collaborative device 10b receives data from the source device 10a through the link a using the secondary carrier. Thereafter, the collaborative device 10b transmits the HARQ for the received data to the base station through the link c. The link c may be configured by using the primary carrier. Herein, the collaborative device 10b receives data from the source device 10a through an N-th frame of the secondary carrier and transmits HARQ information to the base station through a UL subframe of an N+1-th frame of the primary carrier. In this case, the collaborative device 10b bundles or groups the HARQ for the data received from the source device 10a to transmit the bundled or grouped HARQ to the base station.

The base station that receives the HARQ for the data transmitted by the source device 10a from the collaborative device 10b transmits information on the retransmission or new transmission to the source device 10a through the link 3. That is, when the base station receives the NACK from the collaborative device 10b, the base station transmits a retransmission request or the NACK to allow the source device 10a to retransmit data. Further, when the base station receives the ACK from the collaborative device 10b, the base station allows the collaborative device 10b to transmit the data received from source device 10a to the base station through the link 2 and transmit a signal to perform new transmission to the source device 10 by using the link 3. Herein, the links 2 and 3 may be configured by using the first or secondary carrier. As above, in order to reduce an HARQ timing delay, the collaborative device 10b transmits HARQ information regarding the source device 10a through the N+1-th frame and the base station transmits the HARQ (ACK/NACK) to the source device 10a by using an N+2-th frame. In this case, the HARQ is transmitted to the source device 10a through DL subframe 1 linked with the UL SF0 or a second subframe of the DBDZ. Further, since the HARQ information determined by the collaborative device 10b is transmitted to the source device 10a through the base station, frequent HARQ transmission may occur when the collaborative device 10b transmits an HARQ for data by the unit of a slot or a subframe. Therefore, the collaborative device 10b bundles or groups the HARQ for the data transmitted by the source device 10a to transmit the bundled or grouped HARQ to the base station.

FIG. 5 is an embodiment of an HARQ process performed in collaborative transmission according to embodiments of the present invention.

The HARQ process described in FIG. 5 is applied to a case in which the secondary carrier is used only in data transmission and reception between the source device and the collaborative device.

Figure 5A:
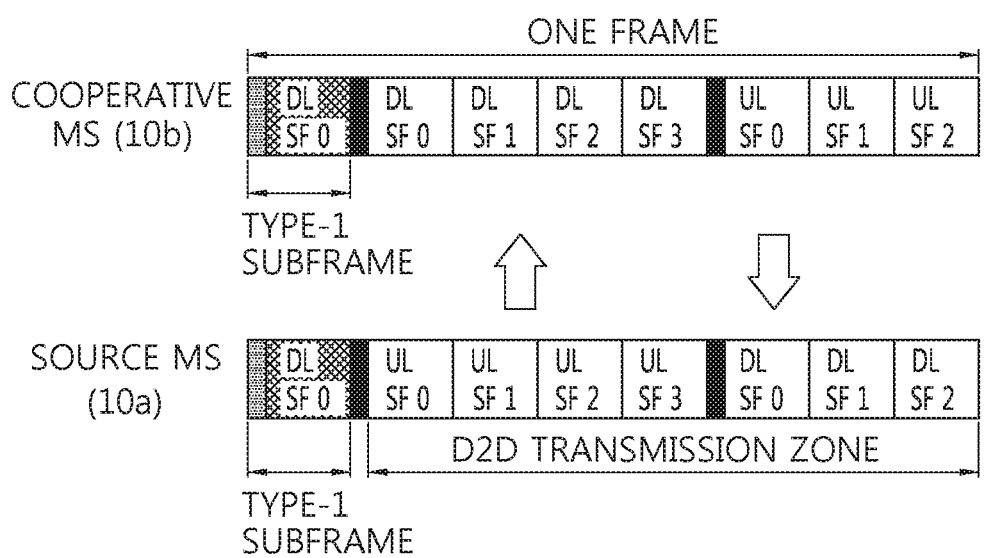
FIG. 5a to FIG. 5d is an embodiment of an HARQ process performed in collaborative transmission according to embodiments of the present invention.
Figure 5B:
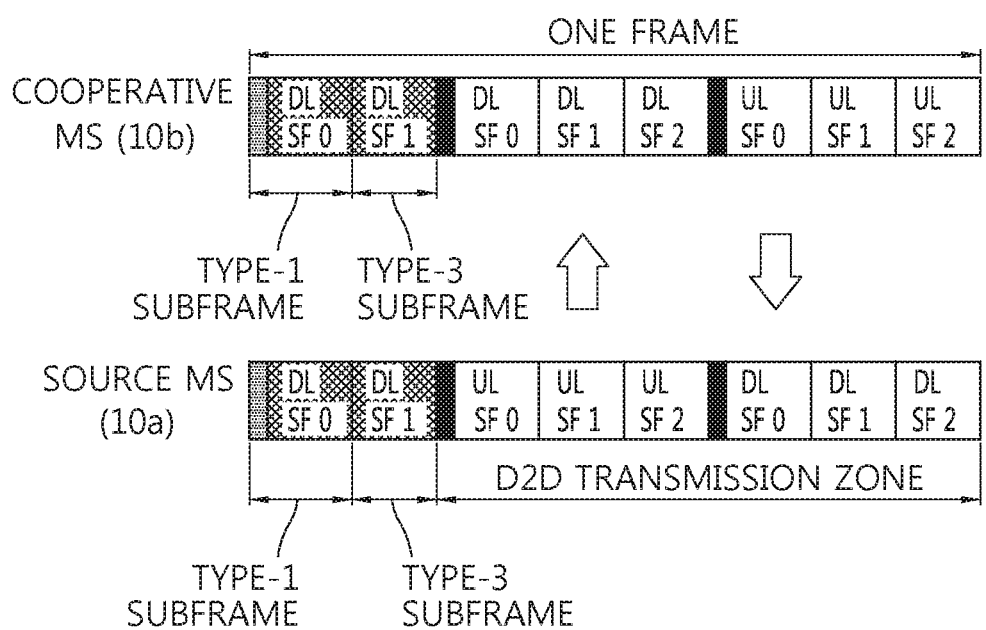

FIGS. 5a and 5b are diagrams showing the structure of the frame used in the secondary carrier for the collaborative transmission. Referring back to FIG. 5c, it can be seen that the frame may be configured by the D2D collaborative downlink zone (DCDZ) and the D2D collaborative uplink zone (DCUZ). Alternatively, the frame may be configured by the D2D collaborative uplink transmit zone (DCUTZ) and the D2D collaborative uplink receive zone (DCURZ). Hereinafter, the structure of the frame will be described with reference to FIGS. 5a and 5b.

One frame includes two gaps. One gap is positioned between a DL subframe allocated to receive the signal from the base station and a subsequent subframe. In this case, the symbol allocated to the gap is a first symbol of a second subframe in FIG. 5a and a last symbol of the second symbol in FIG. 5b.

The other gap is positioned between the DCDZ and the DCUZ to be used as the switching gap, and the gap is positioned between the DCDZ and the DCUZ. Since the collaborative device 10b transfers the data transmitted by the source device 10a to the base station, transmission/reception zones in the frame of the source device 10a and the collaborative device 10b are opposite to each other and if the frame of the source device 10a is configured in the order of the DCDZ and the DCUZ, the frame of the collaborative device 10b is configured in the order of the DCUZ and the DCDZ.

Figure 5C:
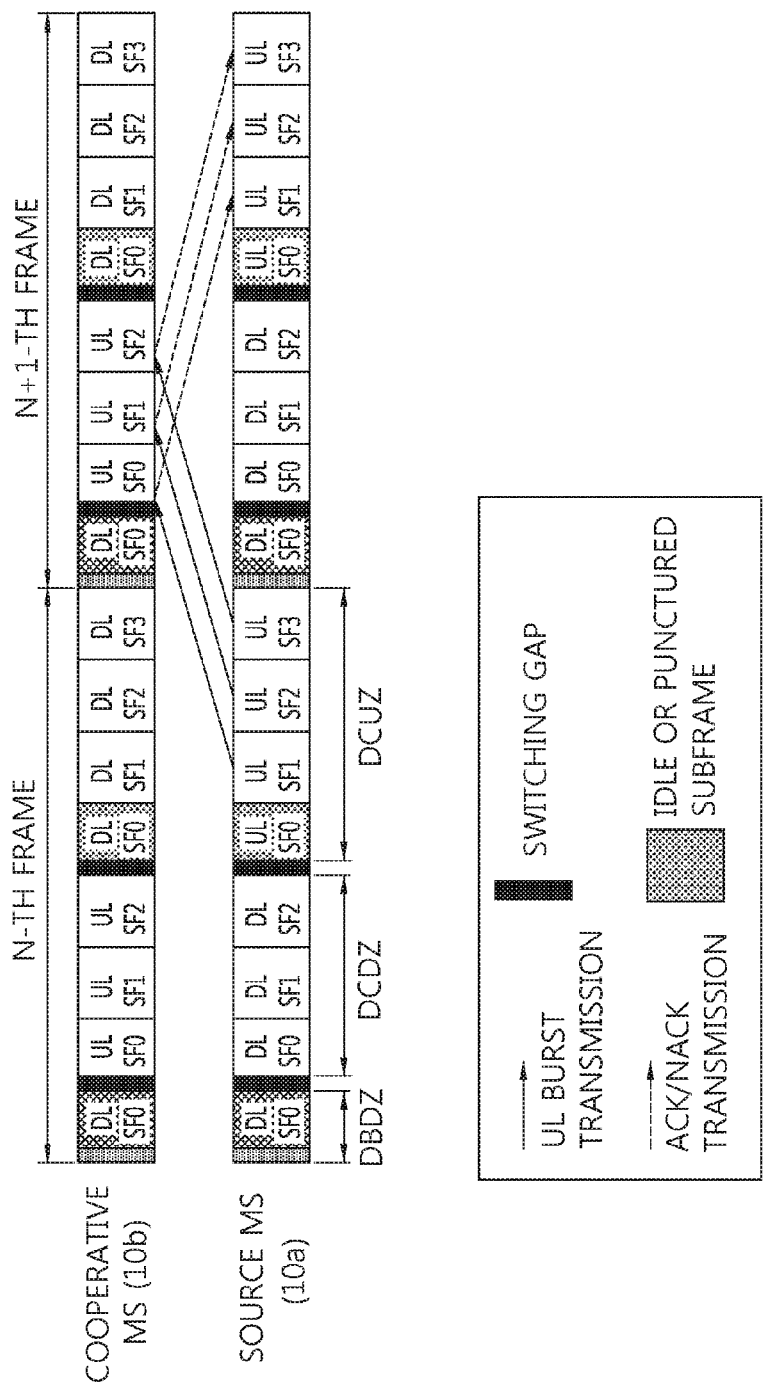

FIG. 5c is a flowchart of a HARQ process according to an embodiment of the present invention.

The source device 10a transmits data to the collaborative device 10b through the DCUZ of the secondary carrier and the collaborative device 10b receives the signal transmitted by the source device 10a through the DCDZ of the same carrier. The collaborative device 10b transmits an HARQ feedback (ACK/NACK) for the received signal to the source device 10a through the DCUZ. The source device 10a receives the HARQ feedback transmitted by the collaborative device 10b through the DCDZ.

As such, a timing and a linkage for the HARQ process by the signal transmission of the source device 10a and the collaborative device 10b may be defined as below.

In time division duplex (TDD) of an IEEE 802.16m system, the DL/UL subframe may transmit and receive an HARQ grant and HARQ information by using a predetermined linkage. For example, when a D/U ratio is 5:3, the HARQ process is performed by a linkage described below.

DL subframe 0 and DL subframe 1=UL subframe 0,
DL subframe 2=UL subframe 1,
DL subframe 3 and DL subframe 4=UL subframe 2.

Such a subframe linkage may be used in transmitting and receiving the HARQ feedback of the D2D transmission.

The devices 10a and 10b receive the preamble, the SFH, the A-MAP, etc. from the base station through DL subframe 0 of FIG. 5a, and DL subframes 0 and 1 of FIG. 5b. The devices transmit the ACK/NACK for the subframe through a linked subframe of the primary carrier.

The devices 10a and 10b perform the HARQ in the rest of subframes other than the subframes DL SF0 or DL SF0 and SF1 that receive the preamble, etc, from the base station. The subframe that receives the preamble, etc, from the base station configures a D2D base station downlink zone (DBDZ). Subframes other than the DBDZ are divided into the D2D collaborative downlink zone (DCDZ) and the D2D collaborative uplink zone (DCUZ), and are used for data transmission and reception between devices. The DCDZ and the DCUZ are positioned to be opposite to each other in the frame of each of the source device 10a and the collaborative device 10b. That is, when the source device 10a is configured in the order of the DCUZ and the DCDZ, the collaborative device 10b is configured in the order of the DCDZ and the DCUZ or in the order opposite thereto.

Referring to FIG. 5c, when one subframe DL SF0 is allocated to the DBDZ, the number of subframes allocated for the collaborative transmission is 7. In this case, the frame used by the source device 10a is configured by four UL subframes and three DL subframes.

The HARQ for the data which the source device 10a transmits to the collaborative device 10b may be performed by using a procedure and a linkage that are described below.

In the related art, when the D/U ratio is 4:4, the linkage between the subframes for the UL HARQ is determined by considering a processing delay as three subframes. That is, DL SF0, DL SF1, DS SF2, and DL SF3 are mapped to UL SF0, UL SF1, UL SF2, and UL SF3, respectively, and HARQ feedbacks for data transmitted in the subframes UL SF0, UL SF1, UL SF2, and UL SF2 are sequentially transmitted in the subframes DL SF0, DL SF1, DS SF2, and DL SF3.

Unlike the related art, since the source device 10a receives a UL grant or allocation for the UL transmission through the DBDZ (DL SF0 in the related art) in the collaborative transmission according to embodiments of the present invention, the UL subframe linked with the DBDZ may be used as the idle duration or may be punctured. That is, the UL SF0 of the DCUZ linked with the DL SF0 of the DBDZ may be used as the idle duration or may be punctured. An HARQ timing according to embodiments of the present invention considering a subframe linkage and a processing time (three subframes) is shown in FIG. 5c.

As shown in FIG. 5c, the source device 10a uses the UL SF0 which is the first subframe of the DCUZ as an idle subframe or punctures the UL SF0. Data which the source device 10a transmits in the UL SF1 of the DCUZ is received through the DL SF1 of the DCDZ of the collaborative device 10b and an HARQ feedback for the data is transmitted to the source device 10a through the UL SF0 of the subsequent frame DCUZ of the collaborative device 10b. The source device 10a and the collaborative device 10b perform the HARQ process by using the linkage formed in such a method.

Figure 5D:
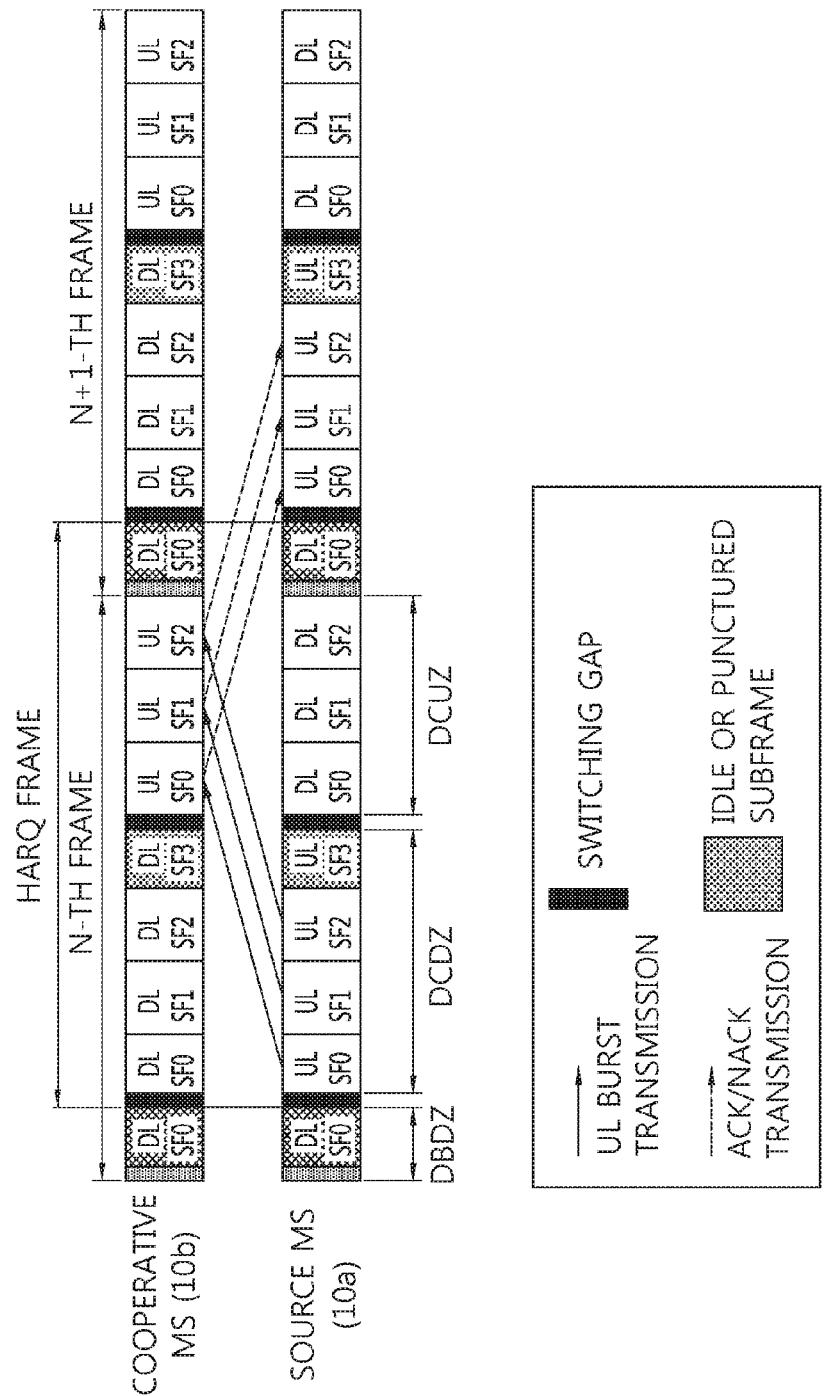

FIG. 5d is a flowchart of an HARQ process according to another embodiment of the present invention.

Unlike as described in FIG. 5c, even when the source device 10a has an FS to start the frame as the DCUZ, an HARQ linkage shown in FIG. 5d may be provided by considering general HARQ mapping and a general processing time.

As described in FIG. 5c, since the HARQ process is performed except for the subframe allocated to the DBDZ, a subframe mapped to the DBDZ subframe is used as the idle duration or the punctured subframe. For example, the DCUZ SF3 of the source device 10a linked to the DL SF0 of the DBDZ is not used. In this case, an HARQ start time may be designated in the frame of the second frame by setting the number of the subframes allocated to the DBDZ as an offset value. That is, in a frame structure shown in FIG. 5d, the source device 10a starts the frame from the SF0 of the DCUZ and ends the frame in the DBDZ SF0 of the N+1-th frame.

Figure 6:
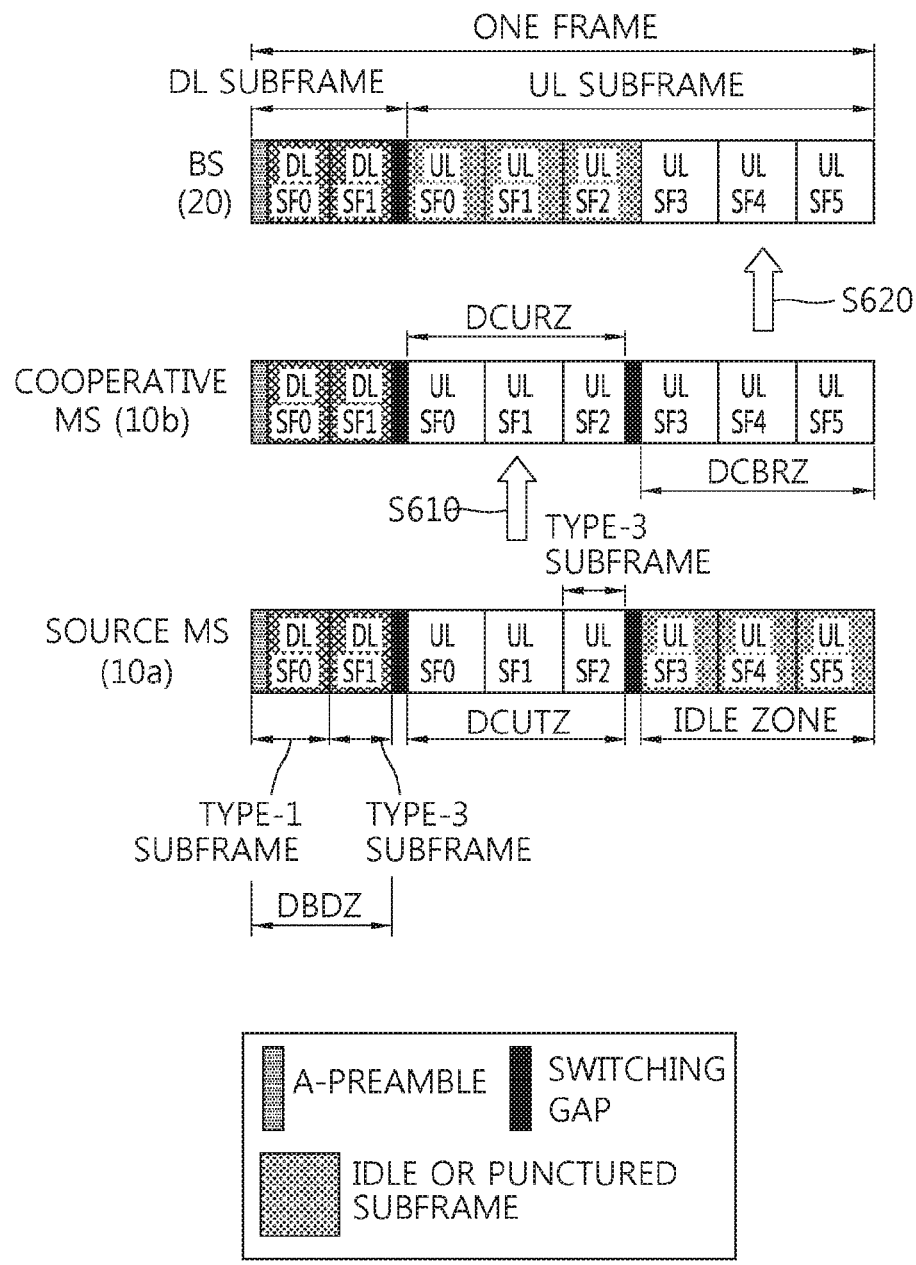
FIG. 6 is another embodiment of an HARQ process performed in collaborative transmission according to embodiments of the present invention.

FIG. 6 is another embodiment of an HARQ process performed in collaborative transmission according to embodiments of the present invention.

Unlike FIG. 5, the secondary carrier assigned for the collaborative communication may be used even in communication between the device and the base station. In this case, the respective devices 10a and 10b maintain the same structure as the frame structure of the base station, and configure a DL/UL zone in the frame to transmit and receive data. Since the DL/UL zone in the frame is switched, a switch gap is necessary. Since one or more symbols are assigned as a gap, the subframe including the gap is configured by a subframe in which one or more symbols are decreased. The gap exists in the UL subframe and is positioned in a first symbol or the last symbol of the UL subframe according to the collaborative device (source device or collaborative device).

In order to use the secondary carrier for the collaborative transmission and the communication with the base station, frames used in the source device 10a and the collaborative device 10b are configured as shown in FIG. 6. First, the frame of the source device 10a is configured by a D2D base station downlink zone (DBDZ) receiving a preamble and the like from the base station 20, a D2D collaborative uplink transmit zone (DCUTZ) transferring data to the collaborative device 10b, and an idle duration. An FS of the collaborative device 10b is configured by a D2D collaborative uplink receive zone (DCURZ) receiving data from the source device 10a and a D2D collaborative transmission to BS relaying zone (DCBRZ) transmitting the data received from the source device 10a to the base station 20. Here, the DBDZ is positioned at first of the frame, and there is no limit to zones positioned at the next to the DBDZ. The DBDZ is configured by two or more subframes, and the reason is that the device receives a midamble transmitted through the second subframe of the frame. A sounding signal or a reference signal for measuring a channel environment between the collaborative device 10b and the base station is transmitted through the subframe of the DCBRZ in the UL frame of the secondary carrier. Indication for the signals and regarding information (sequence index, hopping index, resource allocation, cyclic shift value, and the like) are transmitted through the DL subframe of the DBDZ.

The source device 10a and the collaborative device 10b which perform the collaborative transmission by using the FS shown in FIG. 6 receive a preamble, an SFH, an A-MAP, a midamble, and the like through the DBDZ. As a result, the device maintains synchronization with the base station, and receives information regarding the frame structure used in the secondary carrier and information (reference signal, pilot, MIMO scheme, MCS, PC, time offset, switching gap, and the like) for collaborative transmission. Further, the device receives allocation information for collaborative transmission through the DBDZ, and the signals and the information are masked as a grouping/paring ID allocated for the collaborative transmission or transmitted with the ID. The device measures a midamble transmitted through a DL SF1 of the DBDZ to determine information regarding a link between the base station and the device.

Since the source device 10a transmits the data to the base station through the collaborative device 10b, the source device 10a transmits a bandwidth request (BR) for transmitting the data to the collaborative device 10b to the collaborative device 10b through the DCUTZ, and the collaborative device 10b transmits the BR received from the source device 10a and the BR for transmitting the data by itself to the base station. In this case, the collaborative device 10b may transmit the BRs by bundling or transmit the BRs, respectively. When the BRs of the two devices are transmitted by bundling, BR information is masked and transmitted by the grouping/paring/virtual ID allocated for the collaborative transmission. In this case, in order to divide the bundled BR information, a device indicator may be included in each BR. The device indicator may be configured by 1 bit and indicate the device as follows.

0=source device, 1=collaborative device

When the collaborative transmission is performed by using the frame structure as shown in FIG. 6, since the collaborative device 10b may not receive the signal or the data to the source device 10a, the source device 10a and the collaborative device 10b may perform an HARQ operation by using a HARQ performed between the source device and the base station described in FIG. 4 and an HARQ method performed between the collaborative and the base station.

(1) HARQ Performed Between Source Device and Base Station

As shown in FIGS. 4 and 6, the source device 10a transmits data to the collaborative device 10b through a link a (DCUTZ of the secondary carrier) (S610). The collaborative device 10b transfers the received data through a link C (DCBRZ of the secondary carrier) to the base station without error check (S620). That is, the source device 10a transmits the data to the collaborative device 10b through UL SF 0, 1, and 2 positioned in the DCUTZ of FIG. 6, and the collaborative device 10b may transmit the data received from the source device 10a to the base station by using UL SF3, SF4, and SF5 positioned in the DCBRZ of the same frame. The base station performs an error check for the data received from the collaborative device 10b and transmits the HARQ (ACK/NACK) for the error check to the source device 10a through the DBDZ. In this case, when considering processing time in the UL transmission as the 3 subframe, the HARQ for the data received by the base station in an N-th frame is transmitted through a DBDZ subframe of an N+2-th frame. The source device 10a performs new transmission or re-transmission to the collaborative device 10b according to an HARQ feedback received from the base station.

(2) HARQ Performed Between Collaborative Device and Base Station

As shown in FIG. 6, the source device 10a transmits the data to the collaborative device 10b through the UL SF0, SF1, and SF 2 positioned in the DCUTZ of the N-th frame of the secondary carrier. When considering the processing time in the UL transmission as the 3 subframe, the DCUTZ UL SF0, SF1, and SF2 have a linkage between DCBRZ UL SF 4 and SF5 and DBDZ DL SF0 of the next frame. However, in the DBDZ, since the collaborative device 10b may not perform signal transmission, the UL SF2 linked with the DBDZ subframe is punctured or set as an idle subframe. Accordingly, the collaborative device 10b transmits ACK/NACK for data transmitted by the source device 10a through UL SF0 and 1 to the base station by using the DCBRZ UL SF 4 and SF5 of the same frame. The base station receiving the ACK/NACK for data transmitted by the source device 10a from the collaborative device 10b transmits the ACK/NACK to the source device 10a through the DBDZ of the N+2-th frame by considering the processing time.

As a method of performing the HARQ without puncturing a predetermined subframe or using an idle subframe, an HARQ process may be performed as follows. The source device 10a transmits the data to the collaborative device 10b through the UL SF0, SF1, and SF2 positioned in the DCUTZ of the N-th frame. The collaborative 10b may transmit the data received from the source device 10a to the base station by mapping as follows. In the N-th frame, subframes in the DCBRZ of the collaborative device 10b linked with the UL SF0, UL SF1, and UL SF2 in the DCUTZ of the source device 10a are UL SF4, UL SF5, and UL SF3. In this case, the UL SF3 is a subframe allocated in the collaborative device 10b DCBRZ in the next frame (N+1-th frame). By using the linkage, the collaborative device 10b transmits the HARQ for the data received from the UL SF0, UL SF1, and UL SF2 of the N-th frame to the base station through the UL SF4 and SF5 of the N-th frame DCBRZ, and the UL SF3 of the N+1-th frame DCBRZ. The base station receiving the HARQ transmits ACK/NACK to the source device 10a through the DL SF0 and DL SF1 of the N+2-th frame DBDZ. In this case, in the DL SF0 of the DBDZ, ACK/NACK for the data transmitted by the source device 10a in the UL SF0 and 1 of the N-th frame DCUTZ, and in the DL SF1, ACK/NACK for the data transmitted by the source device 10a in the UL SF2 of the N+1-th frame DCUTZ is included.

Figure 7:
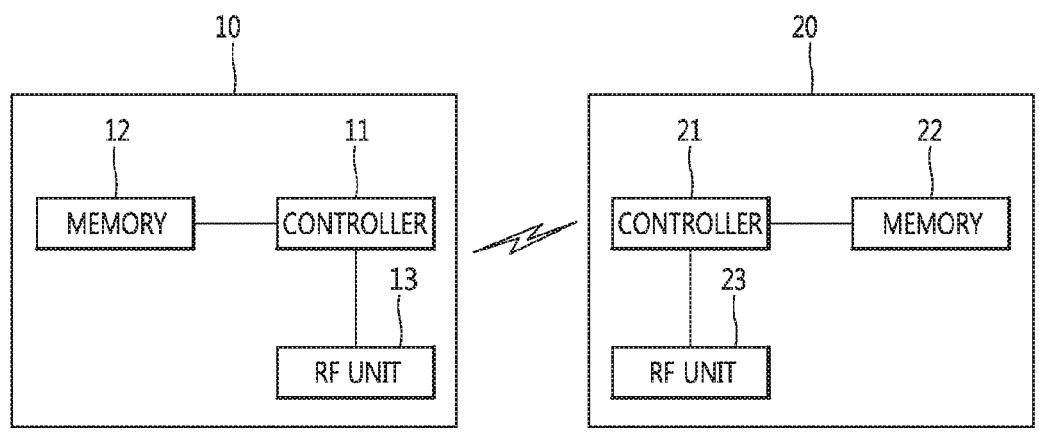
FIG. 7 is a block diagram showing internal structures of a device and a BS according to an embodiment of the present invention.

FIG. 7 is a block diagram showing internal structures of a device and a BS according to an embodiment of the present invention.

A device 10 includes a controller 11, a memory 12, and a radio frequency (RF) unit 13.

Further, the MS also includes a display unit, a user interface unit, etc.

The controller 11 implements the proposed functions, procedures, and/or methods. Layers of a wireless interface protocol may be implemented by the controller 11.

The memory 12 is coupled to the controller 11, and stores a protocol or parameter for performing wireless communication. That is, the memory 12 stores an operating system of the MS, an application, and a general file.

The RF unit 13 is coupled to the controller 11, and transmits and/or receives an RF signal.

In addition, the display unit displays a variety of information of the MS, and may be a well-known element such as liquid crystal display (LCD), organic light emitting diodes (OLED), etc. The user interface unit may be constructed by combining well-known user interfaces such as a keypad, a touch screen, etc.

A BS 20 includes a controller 21, a memory 22, and an RF unit 23.

The controller 21 implements the proposed functions, procedures, and/or methods. Layers of a wireless interface protocol may be implemented by the controller 21.

The memory 22 is coupled to the controller 21, and stores a protocol or parameter for performing wireless communication.

The RF unit 23 is coupled to the controller 21, and transmits and/or receives an RF signal.

The controllers 11 and 21 may include an application-specific integrated circuit (ASIC), a separate chipset, a logic circuit, and/or a data processing unit. The memories 12 and 22 may include a read-only memory (ROM), a random access memory (RAM), a flash memory, a memory card, a storage medium, and/or other equivalent storage devices. The RF units 13 and 23 may include a baseband circuit for processing an RF signal. When the embodiment of the present invention is implemented in software, the aforementioned methods can be implemented with a module (i.e., process, function, etc.) for performing the aforementioned functions. The module may be stored in the memories 12 and 22 and may be performed by the controllers 11 and 21.

The memories 12 and 22 may be located inside or outside the controllers 11 and 21, and may be coupled to the controllers 11 and 21 by using various well-known means.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparently understandable that claims failing to be explicitly cited in the appended claims are combined to construct new embodiments or can be included as new claims by amendment after filing the application.

The present invention may be implemented in another specific form within the scope without departing from the spirit and essential feature of the present invention. Therefore, the detailed description should not limitatively be analyzed in all aspects and should be exemplarily considered. The scope of the present invention should be determined by rational interpretation of the appended claims and all changes are included in the scope of the present invention within the equivalent scope of the present invention. Further, claims having no clear quoting relation in the claims are combined to configure the embodiment or may be included as new claims by correction after application.

What is claimed is:

1. A method for performing a device to device (D2D) communication, the method performed by a first wireless device and comprising:
   receiving, by the first wireless device through a primary carrier, a resource allocation on a secondary carrier from a base station,
   wherein the primary carrier is used for data transmission and reception with the base station; and
   transmitting data to a second wireless device on a subframe of the secondary carrier based on the resource allocation,
   wherein the secondary carrier allocated by the base station is used for data transmission and reception with the second wireless device, and
   wherein a last symbol on the subframe is not used for the transmission to the second wireless device, but is used for a gap symbol.

2. The method of claim 1, further comprising:
   receiving configuration information of the secondary carrier from the base station.

3. The method of claim 2, wherein the configuration information of the secondary carrier includes frame structure information used in the secondary carrier.

4. The method of claim 3, wherein the frame structure information includes an arrangement of an uplink subframe and a downlink subframe in a frame, and
   wherein the uplink subframe and the downlink subframe are allocated to the frame at different times.

5. The method of claim 2, wherein the configuration information of the secondary carrier is received through the secondary carrier.

6. The method of claim 2, wherein the configuration information of the secondary carrier is received through the primary carrier.

7. The method of claim 1, wherein the transmitting comprises directly transmitting the data to the second wireless device.

8. A first wireless device for performing a device to device (D2D) communication, the first wireless device comprising:
   a transceiver; and
   a processor configured to:
   receive, via the transceiver through a primary carrier, a resource allocation on a secondary carrier from a base station,
   wherein the primary carrier is used for data transmission and reception with the base station; and
   transmit data to a second wireless device on a subframe of the secondary carrier based on the resource allocation,
   wherein the secondary carrier allocated by the base station is used for data transmission and reception with the second wireless device, and
   wherein a last symbol on the subframe is not used for the transmission to the second wireless device, but is used for a gap symbol.

9. The first wireless device of claim 8, wherein the processor is further configured to:
   receive, via the transceiver, configuration information of the secondary carrier from the base station.

10. The first wireless device of claim 9, wherein the configuration information of the secondary carrier includes frame structure information used in the secondary carrier.

11. The first wireless device of claim 10, wherein the frame structure information includes an arrangement of an uplink subframe and a downlink subframe in a frame, and
    wherein the uplink subframe and the downlink subframe are allocated to the frame at different times.

12. The first wireless device of claim 9, wherein the configuration information of the secondary carrier is received through the secondary carrier.

13. The first wireless device of claim 9, wherein the configuration information of the secondary carrier is received through the primary carrier.

* * * * *